Feb. 25, 1941.   H. L. DONLEY   2,233,199
SIGNAL DETECTING SYSTEM
Filed Jan. 2, 1940

Inventor
Hugh L. Donley
By
Attorney

Patented Feb. 25, 1941

2,233,199

UNITED STATES PATENT OFFICE 2,233,199

SIGNAL DETECTING SYSTEM

Hugh L. Donley, Collingswood, N. J., assignor to Radio Corporation of America, a corporation of Delaware Application January 2, 1940, Serial No. 312,082

5 Claims. (Cl. 250—27)

This invention relates to systems for detecting signals of the frequency modulated type, and has for its principal object the provision of an improved system and method of operation which permit the use of a single piezoelectric crystal as the frequency discriminating element of the system.

Various types of systems for detecting frequency modulated signals have been proposed. All of these systems include one or another means for converting changes in frequency to corresponding changes in amplitude. The present system differs from previous systems of this character in that the frequency responsive potential is derived through means including a three-electrode piezoelectric crystal. The crystal electrodes are connected in push-pull relation so that signal voltages which are one hundred and eighty degrees out of phase are applied to the two electrodes common to one side of the crystal. This improved system has the advantage that the usual midtap radio frequency impedance device may be omitted. The frequency range over which a linear relationship between frequency and voltage is maintained depends on the resonance and antiresonance frequencies of the crystal, the crystal impedance and the associated electrical elements. In general, this linear relationship holds over a range of a few hundred cycles but this range becomes broader or more extended as the resonance frequency of the crystal is raised or as the separation between the resonance and antiresonance frequencies of the crystal is increased. It is possible by means of this detecting system to obtain a linear relationship between frequency and voltage at a much higher frequency than is possible by means of ordinary electrical elements.

The invention will be better understood from the following description considered in connection with the accompanying drawing, and its scope is indicated by the appended claims.

Referring to the drawing—

Figure 1:
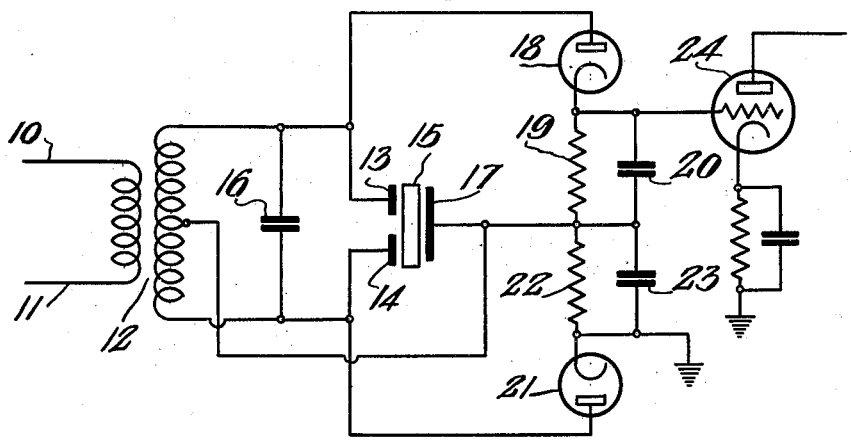
Figure 1 is a wiring diagram of the improved system.

The system of Fig. 1 includes frequency modulated signal supply terminals 10 and 11 which are connected through a coupling transformer 12 to the electrodes 13 and 14 of a piezoelectric crystal 15. The secondary winding of the transformer 12 is shunted by a capacitor 16 for tuning it to the resonance frequency of the crystal 15, and is provided with a midtap terminal which is connected to the electrode 17 of the crystal 15.

Connected between the electrodes 13 and 17 are a rectifier 18 and a resistor 19 which is shunted by a radio frequency bypass capacitor 20. Similarly connected between the electrodes 14 and 17 are a rectifier 21 and a resistor 22 which is shunted by a radio frequency bypass capacitor 23. The lower end of the resistor 22 is connected to ground and the detected signal is supplied from the upper end of the resistor 19 to the input circuit of an amplifier 24.

Figure 2:
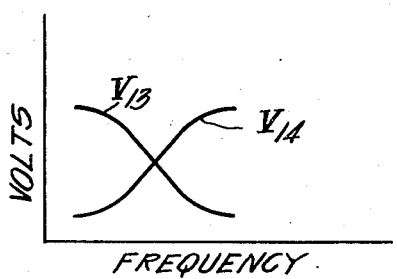
Figures 2 and 3 are explanatory diagrams relating to the operation of the system of Fig. 1.
Figure 3:
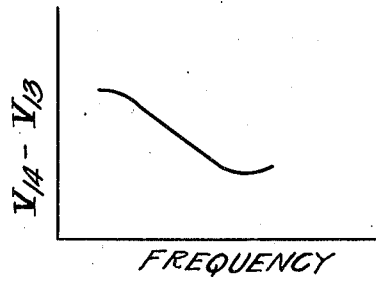

In Fig. 2, the curve $V_{13}$ shows the relation between the signal frequency and the voltage between the electrodes 14 and 17. The curve $V_{14}$ similarly shows the relation between frequency and the voltage between the electrodes 13 and 17. The resultant voltage applied to the resistors 19 and 22 is shown by the curve of Fig. 3. It will be noted that the range of frequencies over which the resultant voltage is linear is subject to the conditions as pointed out in column 1. It is therefore suitable for detecting frequency modulated signals, automatic frequency control purposes, and the like.

It has been found that the characteristics shown in Fig. 2 are obtained when the impedance in shunt with the electrodes 13—17 differs from that in shunt with the electrodes 14—17. For example, small capacity supplied or existing in circuit with the electrodes such as the capacity of the rectifiers 18 and 21 may be designed so that various characteristics other than those shown in Fig. 2 may be obtained. The voltages $V_{13}$ and $V_{14}$ can be made practically zero for certain critical adjustments of the shunt capacities across the electrodes.

In effect, the small shunt capacities determine the frequencies of anti-resonance for the two sections of the three electrode crystal, and when the anti-resonant frequencies are slightly different the characteristics as shown in Fig. 2 are obtained.

I claim as my invention:

1. In a system for detecting frequency modulated signals, the combination of a piezoelectric element interposed between a single electrode and a pair of electrodes, means for applying between said single electrode and the electrodes of said pair signal voltages which are substantially 180 degrees out of phase with one another, and means for deriving from said electrodes a resultant potential which is proportional to the frequency of said signal.

2. In a system for detecting frequency modulated signals, the combination of a piezoelectric element interposed between a single electrode and a pair of electrodes, means for applying between said single electrode and the electrodes of said pair signal voltages which are out of phase with one another, a pair of impedance elements provided with a common terminal connected to said single electrode and with end terminals, and means including a detecting element connecting one of said end terminals to one electrode of said pair and a similar detecting element connecting the other of said end terminals to the other electrode of said pair.

3. In a system for detecting frequency modulated signals, the combination of a piezoelectric element interposed between a single electrode and a pair of electrodes, means for applying between said single electrode and the electrodes of said pair signal voltages which are substantially 180 degrees out of phase with one another, a pair of impedance elements provided with a common terminal connected to said single electrode and with end terminals, means including a detecting element connecting one of said end terminals to one electrode of said pair and a similar detecting element connecting the other of said end terminals to the other electrode of said pair, and radio frequency bypass means connected in shunt to said impedance elements.

4. In a system for detecting frequency modulated signals, the combination of a piezoelectric element interposed between a single electrode and a pair of electrodes, means for applying between said single electrode and the electrodes of said pair signal voltages which are out of phase with one another, a pair of impedance elements provided with a common terminal connected to said single electrode and with end terminals, means including a detecting element connecting one of said end terminals to one electrode of said pair and a similar detecting element connecting the other of said end terminals to the other electrode of said pair, and means for deriving from said impedance elements a potential which is proportional to the frequency of said signal.

5. In a system for detecting frequency modulated signals, the combination of a piezoelectric element interposed between a single electrode and a pair of electrodes, means for applying between said single electrode and the electrodes of said pair signal voltages which are out of phase with one another, and means for deriving from said electrodes a resultant potential which is proportional to the frequency of said signal.

HUGH L. DONLEY.